United States Patent
Hogg, Jr.

(10) Patent No.: US 7,945,037 B1
(45) Date of Patent: May 17, 2011

(54) SYSTEM AND METHOD FOR REMOTE CALL FORWARD DETECTION USING SIGNALING

(75) Inventor: John S. Hogg, Jr., Bedford, TX (US)

(73) Assignee: Securus Technologies, Inc., Dallas, TX (US)

( * ) Notice: Subject to any disclaimer, the term of this patent is extended or adjusted under 35 U.S.C. 154(b) by 1211 days.

(21) Appl. No.: 11/562,887

(22) Filed: Nov. 22, 2006

(51) Int. Cl.
H04M 3/42 (2006.01)

(52) U.S. Cl. .......... 379/211.02; 379/201.01; 379/201.02

(58) Field of Classification Search ............. 379/211.02, 379/201.01, 201.02
See application file for complete search history.

(56) References Cited

U.S. PATENT DOCUMENTS

| | | |
|---|---|---|
| 3,790,700 A | 2/1974 | Callais et al. |
| 3,798,359 A | 3/1974 | Feistel |
| 3,798,605 A | 3/1974 | Feistel |
| 3,806,874 A | 4/1974 | Ehrat |
| 4,935,956 A | 6/1990 | Hellwarth et al. |
| 4,993,062 A | 2/1991 | Dula et al. |
| 5,185,781 A | 2/1993 | Dowden et al. |
| 5,210,789 A | 5/1993 | Jeffus et al. |
| 5,247,569 A | 9/1993 | Cave |
| 5,255,305 A | 10/1993 | Sattar |
| 5,517,555 A | 5/1996 | Amadon et al. |
| 5,604,792 A | 2/1997 | Solomon et al. |
| 5,627,887 A | 5/1997 | Freedman |
| 5,655,013 A | 8/1997 | Gainsboro |
| 5,832,068 A | 11/1998 | Smith |
| 5,875,236 A | 2/1999 | Jankowitz et al. |
| 5,963,625 A | 10/1999 | Kawecki et al. |
| 5,982,870 A * | 11/1999 | Pershan et al. ........... 379/221.08 |
| 6,029,062 A | 2/2000 | Hanson |
| 6,064,972 A | 5/2000 | Jankowitz et al. |
| 6,078,892 A | 6/2000 | Anderson et al. |
| 6,088,431 A | 7/2000 | LaDue |
| 6,141,406 A | 10/2000 | Johnson |

(Continued)

FOREIGN PATENT DOCUMENTS

EP 1 175 074 A2 1/2002

(Continued)

OTHER PUBLICATIONS

"BubbleLINK® Software Architecture," SciDyn™, The Voice of IP Technology™, Nov. 4, 2005, 10 pages, http://www.scidyn.com/products/BubbleLink%20White.pdf.

(Continued)

*Primary Examiner* — Quynh H Nguyen
(74) *Attorney, Agent, or Firm* — Fogarty, L.L.C.

(57) ABSTRACT

Disclosed are systems and methods for using messages received from a remote switch to detect remote call forwarding. Embodiments utilize call intelligence associated with a database on an SS7 network to receive messages from a terminating switch. The return address of the message may be compared to an expected terminating switch address to confirm that the expected switch terminated the call. Embodiments may further compare a terminating phone number contained within the received message to an expected terminating phone number. Embodiments provide for various call handling in the event that a query is received from a switch other than the expected terminating switch. Such call handling may include terminating the call, recording the call, attempting to identify the called party, notifying proper authorities of the call, and/or the like. Embodiments of the invention may be deployed as part of a controlled environment facility service provider system, or in particular a detention facility service provider system.

23 Claims, 3 Drawing Sheets

U.S. PATENT DOCUMENTS

| | | | |
|---|---|---|---|
| 6,188,751 | B1 | 2/2001 | Scherer |
| 6,195,422 | B1 | 2/2001 | Jones et al. |
| 6,307,926 | B1 | 10/2001 | Barton et al. |
| 6,320,946 | B1 | 11/2001 | Enzmann et al. |
| 6,320,948 | B1 | 11/2001 | Heilmann et al. |
| 6,324,280 | B2 | 11/2001 | Dunn et al. |
| 6,330,546 | B1 | 12/2001 | Gopinathan et al. |
| 6,363,065 | B1 | 3/2002 | Thornton et al. |
| 6,373,930 | B1 | 4/2002 | McConnell et al. |
| 6,393,113 | B1 | 5/2002 | Karras |
| 6,404,764 | B1 | 6/2002 | Jones et al. |
| 6,404,857 | B1 | 6/2002 | Blair et al. |
| 6,480,590 | B1 | 11/2002 | Ku |
| 6,487,200 | B1 | 11/2002 | Fraser |
| 6,516,056 | B1 | 2/2003 | Justice et al. |
| 6,553,336 | B1 | 4/2003 | Johnson et al. |
| 6,636,591 | B1 | 10/2003 | Swope et al. |
| 6,639,977 | B1 | 10/2003 | Swope et al. |
| 6,639,978 | B2 | 10/2003 | Draizin et al. |
| 6,658,393 | B1 | 12/2003 | Basch et al. |
| 6,687,364 | B1 | 2/2004 | Lehtinen |
| 6,836,540 | B2 | 12/2004 | Falcone et al. |
| 6,920,209 | B1 | 7/2005 | Gainsboro |
| 6,947,532 | B1 | 9/2005 | Marchand et al. |
| 6,985,478 | B2 | 1/2006 | Pogossiants et al. |
| 7,042,992 | B1 | 5/2006 | Falcone et al. |
| 7,075,919 | B1 | 7/2006 | Wendt et al. |
| 7,106,843 | B1 | 9/2006 | Gainsboro et al. |
| 7,333,798 | B2 | 2/2008 | Hodge |
| 7,496,190 | B1 * | 2/2009 | Kung et al. ............... 379/211.02 |
| 2002/0168060 | A1 | 11/2002 | Huie |
| 2002/0176403 | A1 | 11/2002 | Radian |
| 2002/0184103 | A1 | 12/2002 | Shah et al. |
| 2002/0194096 | A1 | 12/2002 | Falcone et al. |
| 2002/0194113 | A1 | 12/2002 | Lof et al. |
| 2003/0002639 | A1 | 1/2003 | Huie |
| 2003/0046208 | A1 | 3/2003 | Lubking et al. |
| 2003/0185204 | A1 | 10/2003 | Murdock |
| 2003/0200182 | A1 | 10/2003 | Truitt et al. |
| 2004/0052218 | A1 | 3/2004 | Knappe |
| 2004/0078328 | A1 | 4/2004 | Talbert et al. |
| 2005/0195951 | A1 | 9/2005 | Bunker |

FOREIGN PATENT DOCUMENTS

| | | |
|---|---|---|
| JP | 2002-157627 A | 5/2002 |
| JP | 2003110758 A | 4/2003 |

OTHER PUBLICATIONS

"Call Control—Commander II:," SciDyn™ Products, Nov. 4, 2005, 3 pages, http://www.scidyn.com/products/commander2.html.

"ShoreTel- Intelligent Phone Systems," ShoreTel, Nov. 4, 2005, 4 pages, http://www.shoretel.com/STCorp/products/architecture.aspx.

"SciDyn VoIP Technology Now Available for Call Control Solutions," SciDyn™ Press Release, Nov. 4, 2005, 2 pages.

"Smart Features for Optimizing Your Network," SciDyn™ BubbleLINK®, Nov. 4, 2005, 2 pages, http://www.scidyn.com/products/bubble.html.

Federal Prisoner Health Care Copayment Act of 2000, House of Representatives Report 106-851, 106th Congress 2d Session, Sep. 14, 2000, 23 pages.

International Search Report for European Patent Application No. 07252653.6 based on U.S. Appl. No. 11/0480,264, "Systems and Methods for Account Management Using Interrupt Messaging," Evercom Systems, Inc., Mar. 3, 2008, 12 pages.

Swope, B., et al., U.S. Appl. No. 09/640,831, "System and Method for Reverse Billing for Telephone Call," Aug. 17, 2000.

Lord, M., U.S. Appl. No. 09/995,253, "Method and Apparatus for Exchanging Data Between a Primary Computer System and an External Computer System to Ensure Transactional Reconciliation Between the Systems," Nov. 27, 2001.

Draizin, N., et al., U.S. Appl. No. 10/022,946, "A Method for Determining an Entity Responsible for Billing a Called Party," Dec. 17, 2001.

Viola, J., et al., U.S. Appl. No. 10/135,878, "Information Management and Movement System and Method," Apr. 29, 2002.

Falcone, R., et al., U.S. Appl. No. 10/135,883, "Optimizing Profitability in Business Transactions," Apr. 29, 2002.

Falcone, R.,et al., U.S. Appl. No. 10/190,315, "Systems and Methods for Offering a Service to a Party Associated with a Blocked Call," Jul. 3, 2002.

Mudd, R., et al., U.S. Appl. No. 10/217,149, "System and Method of Call Treatment," Aug. 12, 2002.

Lord, M., U.S. Appl. No. 10/252,956, "Three-Way Telephone Call Prevention System and Method," Sep. 20, 2002.

Reid, G., et al., U.S. Appl. No. 10/306,248, "Communicating Solution Information in a Knowledge Management System," Nov. 27, 2002.

Falcone, R., et al., U.S. Appl. No. 10/360,248, "Systems and Methods for Account Establishment and Transaction Management Using Interrupt Messaging," Feb. 7, 2003.

Falcone, R., et al., U.S. Appl. No. 10/360,442, "Systems and Methods for Transaction Authorization Determination," Feb. 7, 2003.

McNitt, G., et al., U.S. Appl. No. 10/420,585, "System and Method for Detecting Unauthorized Call Activity," Apr. 22, 2003.

Hite, M., et al., U.S. Appl. No. 10/437,839,"Intelligent Queuing of Transaction Records," May 14, 2003.

Sullivan, R. et al., U.S. Appl. No. 10/602,233, "Systems and Methods for Transaction Management," Jun. 24, 2003.

Falcone, R., et al., U.S. Appl. No. 10/640,505,"System and Method for Called Party Controlled Message Delivery," Aug. 13, 2003.

Polozola, M., U.S. Appl. No. 11/386,056, "Management of Provision of Services Based at least in Part Information About a Payor's Utility," Mar. 21, 2006.

U.S. Appl. No. 10/135,878, filed Nov. 22, 2006, Viola et al.
U.S. Appl. No. 10/135,883, filed Nov. 22, 2006, Falcone et al.
U.S. Appl. No. 10/646,638, filed Nov. 22, 2006, Kurth et al.
U.S. Appl. No. 10/217,149, filed Nov. 22, 2006, Mudd et al.
U.S. Appl. No. 10/642,532, Nov. 22, 2006, Robert L. Rae.

* cited by examiner

SYSTEM AND METHOD FOR REMOTE CALL FORWARD DETECTION USING SIGNALING

CROSS-REFERENCE TO RELATED APPLICATIONS

The present invention is related to co-pending and commonly assigned U.S. patent application Ser. No. 10/642,532 entitled "Centralized Call Processing," filed Aug. 15, 2003, U.S. patent application Ser. No. 10/800,473 entitled "Call Processing with Voice Over Internet Protocol Transmission," filed Mar. 15, 2004, U.S. patent application Ser. No. 10/135,883 entitled "Optimizing Profitability in Business Transactions," filed Mar. 29, 2002, U.S. patent application Ser. No. 10/135,878 entitled "Information Management and Movement System and Method," filed Jul. 26, 2002, U.S. patent application Ser. No. 10/360,442 entitled "Systems and Methods for Transaction Authorization Determination," filed Feb. 7, 2003, U.S. patent application Ser. No. 11/386,032 entitled "System and Method for Account Establishment and Transaction Management using Interrupt Messaging," filed Mar. 21, 2006, U.S. patent application Ser. No. 10/701,549 entitled "Systems and Methods for Cross-Hatching Biometrics with Other Identifying Data," filed Nov. 5, 2003, U.S. patent application Ser. No. 10/217,149 entitled "System and Method for Call Treatment," filed Aug. 12, 2002, U.S. patent application Ser. No. 10/646,638 entitled "Systems and Methods for Remote Call Redirection Detection and Treatment," filed on Aug. 22, 2003, and commonly assigned U.S. Pat. No. 6,141,406 entitled "Method and Apparatus for Detecting a Secondary Destination of a Telephone Call Based on Changes in the Telephone Signal Path," filed May 30, 1997, the disclosures of each of which are hereby incorporated herein by reference in their entirety.

TECHNICAL FIELD

The present invention relates generally to telecommunications, and more particularly to using messages from a terminating switch to detect remote call forwarding.

BACKGROUND OF THE INVENTION

Since the divestiture of North America's telecommunication market, there has been an increase in the number of participants throughout the various fields of the industry: both facilities and non-facilities based. Additional competitors, e.g., competitive local exchange carriers (CLECs) have joined incumbent local exchange carriers (ILECs), local service providers (LSPs), line resellers, service providers, etc., in the telephony market.

The competition among competitors is carried out over the public switched telephone network (PSTN). The PSTN is the means through which the various competitor's systems work together to connect a call originating with one provider's network and terminating with another provider's network. Among the basic building blocks of the PSTN are the switching, signaling, and intelligent network service systems. The switching systems are spread throughout the world primarily as central (local) office switches or service switching points (SSP). These switches connect the line of one party to another party's line or to an outgoing interoffice transmission facility. In addition to switching calls, SSPs also provide usage measurements of calls for billing purposes. Interoffice transmission facilities comprise the physical medium (typically fiber optics or wireless) to connect switching systems.

The signaling system provides the signaling capabilities to establish a call between switching systems. The most common type of signaling used in the PSTN in the United States is referred to as Common Channel Signaling System Number 7 (CCS/SS7 or simply SS7). A telecommunications network that uses SS7 signaling sends signaling messages or packets over a packet network to exchange call control and service information among network elements. SS7 is a key element in supporting a large number of applications in telecommunications networks ranging from call control or basic call setup, to intelligent network services and efficient interconnection of networks for the various competitors in the market.

A segment of the competitive marketplace has developed around providing telecommunication services to certain facilities where a caller has limited options for services, such as local and long distance calling services, or where access to the telecommunication network is controlled. These telecommunication companies include companies that provide services to dormitories, hotels, hospitals, and detention facilities, such as jails or prisons.

As an example, detention facilities generally require various levels of security over the calls made by inmates. Typically, the detention facility would contract with a service provider (DFSP), which is capable of providing the specialized telecommunication services that detention facilities might need, for a communications system that allows the inmate to interface with the PSTN, while maintaining an appropriate level of security over the call. Because of the increased level of security over the calls, these service providers typically charge an inmate higher rates for long distance and local connections over the PSTN than would normally be charged by other carriers in the competitive marketplace.

In order to establish service at a detention facility, the DFSP would interpose its network and/or call processing system between the PSTN and an inmate in the detention facility. The DFSP would typically provide its phone equipment and call processing for an inmate's calls through a network that interfaces over a high capacity line, such as a T1 line, with the PSTN. Once on the PSTN, the calls are ultimately terminated at the desired telephone number through the use of another service provider's lines and equipment, which is set up and connected by the use of the intelligent network elements described hereinabove. Thus, the inmate would be granted access to other calling companies networks through the DFSP network and/or call processing system.

This system may include various features aimed at providing specialized services that may be desirable in a detention facility. These services may include call treatment measures such as increased security over the calls, caller identification, controlled access between the PSTN network and the detention facility telecommunications network, recording the inmate's phone conversations, maintaining a database of all calls to and from the facility/inmates, notifying the appropriate authorities about a call in a timely manner, and account verification for call payment information. This listing of services is not meant to be exhaustive of all services that may be provided or requested.

After initiation of a phone call attempt either by or to an inmate, an interaction begins with a call processing system of the DFSP, wherein the appropriate call treatment measures are determined. It should be understood that various levels of security and call treatment measures may be invoked for different inmates and different facilities. As an example, the process may start with an inmate accessing the DFSP network by trying to place a call at one of the telephone terminals located at various locations in the detention facility and designated for use by the inmates to make telephone calls. The call may begin with the inmate identifying him/herself through the use of a personal identification number, password, or some other means of identification whereby the DFSP can verify the identify of the inmate for use in further call verification procedure.

A call verification procedure that might occur after the inmate enters a PIN number is a determination concerning the method of payment for the call. Some of the methods for paying for the call include a prepaid account credited with a certain amount of money against which the call charges will be debited, alternative call billing (e.g., reversing the call charges (a collect call) or billing the call to a third party), or the use of a detention facility account (e.g., the detention facility may have authorized payment for the call, such as a call to the prisoner's lawyer). If the call is an alternatively billed call, then call processing may make a determination about the probability that appropriate funds may be collected from a responsible party (e.g., the called party or a third party).

Information about an inmate may be stored in a database, such as may be created and/or maintained by the DFSP. Such a database may contain information about the inmate such as pre-paid account information, the level of security that should be maintained over the call, a list of numbers the inmate has been authorized to call, a list of numbers the inmate is not allowed to call (such a the judge, or victim), whether the call should be recorded, and whether a person at the detention facility or at a governmental agency should be notified about the call. Thus, depending on the level of security that is to be maintained over the call and the particular type of facility and/or inmate, these and other security and/or call treatment measures may be invoked.

One of the security measures that may be invoked during call processing would be cross referencing the number dialed by the inmate against a list of numbers that the inmate is prohibited from calling. This list may include the numbers of persons such as the judge, or the crime victim. Prison administrators are often interested in knowing the termination point for inmate calls, such as to prevent calls to certain individuals (e.g., gang members), certain areas (e.g., high crime areas), certain facilities (e.g., other prison facilities), etc. Moreover, the identity of the called party, such as may be obtained through the Billing Telephone Number (BTN), is often of interest to investigators. Accordingly, if the inmate attempts to call an unauthorized number or otherwise attempts a call posing a security risk, the call may be blocked before a connection is established and/or the call can be reported to prison authorities. If a call is allowed to proceed, a decision may also be made to record the call, so that the contents of the call can be made available to the appropriate authorities. As can be seen from the above description, it is often important to know both the number dialed and the actual termination point of the call in order to prevent the inmate from circumventing the security measures.

As a result of these added security measures, the DFSP have higher operating costs, which are recouped to some extent through higher calling charges than would ordinarily be charged in the competitive marketplace. Unfortunately, enhanced calling services have been misused by certain businesses and individuals in an attempt to profit by arbitraging the higher rates charged by the DFSP. In order to arbitrage the higher rates, an arbitrage business might obtain, from a LEC or other competitor, a phone number in the LEC's network that is local or intralata to the prison facility. The arbitrage business may then establish a remote call forwarding (RCF) service at that phone number to forward calls to a different termination point. Accordingly, the call may appear to the DFSP to be a local call, charged at a rate lower than a long distance call, when in fact the call terminates at a location which would result in a long distance rate by the DFSP. However, because the arbitrage business is not providing the security services of the DFSP, the arbitrage business provides this long distance link at closer to market rates than does the DFSP.

An inmate, or a friend or family member of the inmate, who desires to avoid the higher long distance rates charged by the DFSP could then use the local number where a RCF platform has been established to provide the RCF service. This call would be charged by the DFSP at a rate for local call and be received by the RCF platform, which would then forward the call to the desired number. By charging a rate for the call that is lower than the rate that charged by the DFSP for a long distance call, the business operating the RCF service could thus profit at the expense of the DFSP while the inmate saves an amount equal to the difference between the higher and lower rate. However, since the true termination point of the call is different from the called number, the DFSP not only loses revenue, but also loses visibility over the true destination where the telephone call is terminated and thus security may be compromised.

Usually the destination phone number that the inmate is trying to reach would belong to a person, such as a family member or a friend of the inmate, who lives at a location where a call would be charged at a long distance rate by the DFSP. When a RCF business establishes a local telephone number at a location, they typically provide their own Billing Name and Address (BNA) to the Local Exchange Carrier (LEC). Then, they place a RCF platform that provides the RCF services at that location.

The RCF platforms often operate through the use of a Direct Inward Dialing (DID) circuit. A call received at the DID circuit is preceded by a packet of information that contains the number dialed. The remote call forwarding platform receives the call and looks up the corresponding long distance number and then forwards the call to that number. Thus, when the prisoner calls the assigned local number, the platform receives the call and automatically forwards the call to the telephone number of the family member or friend programmed as the final destination number for that call.

As previously discussed this arbitrage activity causes several problems for the DFSP and the prison facility. Primarily the call forwarding activity diminishes the level of security over the call by terminating the call at a location remote from the called number, causing the service provider to lose visibility of the final termination point of the call. Thus, the service provider is unable to collect accurate information regarding the call activity in order to block the call, report the call to the prison facility, etc. Another consideration for the service provider is the revenue lost to these call forwarding businesses. Several methods currently exist for determining that a call has been redirected. Examples of these methods can be found in United States patent applications "Systems and Methods for Remote Call Redirection Detection and Treatment," "System and Method for Call Treatment," and U.S. Pat. No. 6,141,406 entitled "Method and apparatus for detecting a secondary destination of a telephone call based on changes in the telephone signal path," previously incorporated by reference.

BRIEF SUMMARY OF THE INVENTION

The present invention is directed to systems and methods for using signaling from a terminating switch, such SS7 caller ID with name (CNAM) queries, to detect remote call forwarding. In an embodiment of the invention, a database is hosted on the SS7 network co-located or incorporated into a CNAM database. The database may be populated with records containing an originating phone number and a terminating number. The information may be provided by originating equipment to the database. In some embodiments, the originating equipment is the call processing system of a Controlled Environment Facility Service Provider (CEFSP). The originating equipment or call intelligence associated with the database on the SS7 network may look up the terminating switch on which the terminating phone number is homed before a query on that call is received. The look up may be accomplished by a simple search of a Local Exchange Routing Guide (LERG) tables, or may require an LNP query when the desired terminating number has been ported. After the call is launched, if the subscriber at the eventual terminating number has subscribed to name and number delivery, a query will be sent to the database to obtain the name information. In some embodiments, the query will include the originating phone number that is the subject of the query, the address of the switch sending the query and may contain the requesting phone number. Call intelligence associated with the database may examine the address of the switch requesting the query and compare it to the expected terminating switch looked up prior to receiving the query. In some embodiments, the call intelligence may similarly compare the terminating phone number contained in the query to the expected terminating phone number. In a preferred embodiment, the comparison is performed at the database on the SS7 network in order to make a positive or negative decision with respect to the call very rapidly.

Embodiments of the present invention provide for call treatment determinations when the query information does not match the expected information. The call intelligence associated with the database on the SS7 network may inform the originating equipment of the mismatch to allow the originating equipment to provide a call treatment determination. Call treatment determinations may include releasing the call, not completing the call, placing a customer service representative on the call, providing an alert to the proper personnel, lowering a payment verification point (PVP) or post-payment value amount, and/or the like.

Embodiments of the present invention may also involve the call intelligence associated with the database on the SS7 network taking action in response to a mismatch. In some embodiments, the call treatments discussed above may be performed by the call intelligence. Additionally, the call intelligence may respond to the CNAM query differently in the event of a mismatch. As discussed above, a database may be populated shortly before a query in response to a call is received. The database record for the call may contain a name to be transmitted in response to a CNAM query. This name may have been provided by the original equipment, in some cases selected by the original equipment based the identity of the caller and the destination phone number. The call intelligence may choose to transmit this name when the identification information from the query and the expected identification information match and may choose to transmit a different name when the information does not match. The call intelligence may direct the CNAM database to transmit a generic phrase such as PRIVATE or OUT OF AREA. The originating equipment may in some embodiments transmit to the database a name to transmit in the event of a match, such as the caller's name, and a name to transmit in the event of a mismatch, such as the name of the facility.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
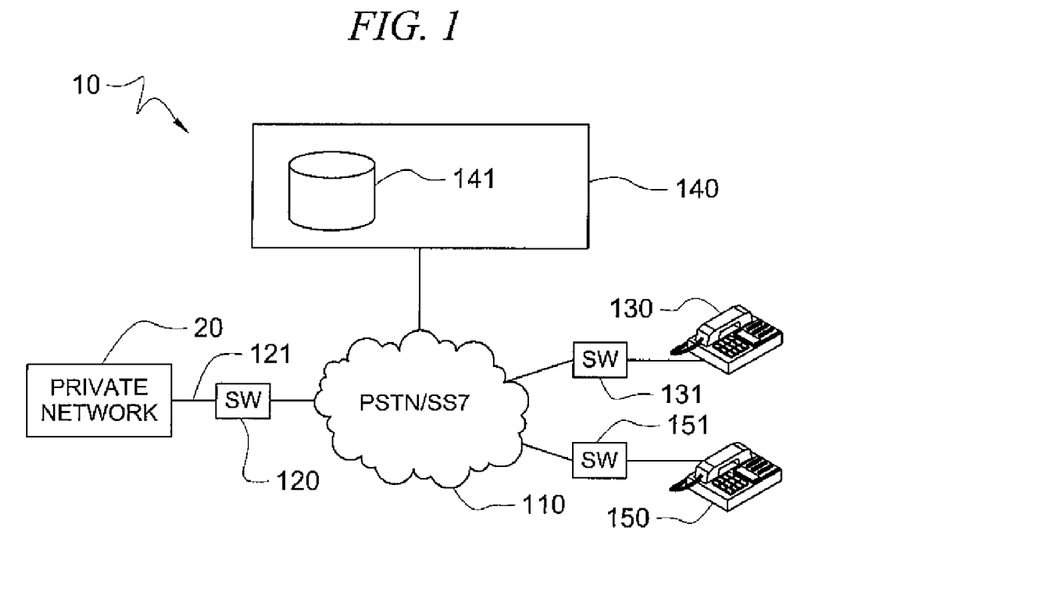
FIG. 1 shows a communications system adapted according to an embodiment of the current invention.

FIG. 1 shows communications system 10 adapted according to an embodiment of the invention. System 10 includes private network 20 and terminals 130 and 150 coupled by communications network 110. Terminal 130 may be coupled to communications network 110 through switch 131 and terminal 150 may be coupled to communications network 110 through switch 151. In some embodiments, switch 131 or terminal 130 may contain remote call forwarding hardware or software such that a call directed to terminal 130 is redirected to terminal 150 on switch 151. Private network 20 may be coupled to communications network 110 through switch 120 by communications link 121. When a call is originated from private network 20, private network 20 may be known as originating equipment for that call. Communications link 121 may be a LAN, WAN, MAN, intranet, internet, cable transmission system, satellite transmission system and/or the like. Private network 20 may comprise a private branch exchange (PBX), call processor and/or the like. In a preferred embodiment, private network 20 may be a call processing system deployed for use with respect to one or more controlled environment facilities. Communications network 110 may comprise a PSTN and a signaling network such as an Advanced Intelligent Network (AIN), using SS7 signaling. Communications network 110 may alternatively or additionally utilize additional networks (e.g., the internet, an intranet, LAN, MAN, WAN, wireless network, cable transmission system, satellite transmission system and/or the like) and/or additional or alternative signaling networks. It should be appreciated that the signaling network may be provided external or integral to the base communications network.

Further coupled to communications network 110 is CNAM database 141 and accompanying call intelligence 140. It should be appreciated that CNAM database 141 and accompanying call intelligence 140 may be disposed centrally, such as for use with a plurality of calling party locations or private networks 20, locally, such as for use with an associated calling party location or private network 20 (e.g., a particular facility or private network for which calling services are provided), or combinations thereof (e.g., a distributed configuration). In a preferred embodiment, one or more call intelligence functions may be located in call intelligence 140 on the SS7 network in order to increase processing speed. Alternatively, one or more call intelligence functions may be performed by private network 20, described in detail below. CNAM database 141 and accompanying call intelligence 140 may also be coupled directly to private network 20 through communications link 150, which may comprise the internet, an intranet, LAN, MAN, WAN, wireless network, cable transmission system, satellite transmission system and/or the like. Alternatively, private network 20 and CNAM database 141 and accompanying call intelligence 140 may simply communicate over communications network 110. In a preferred embodiment, CNAM database 141 may be a dynamically updated database containing caller identification information. In another embodiment, CNAM database 141 may comprise a database containing caller identification information and a second database containing data about the expected destination of a call originated from a phone number contained in the database containing caller identification information. In this configuration, the database containing caller identification information and the second database may be co-located or may be physically remote from each other. In such a configuration, the database containing caller identification information may contain semi-static information that need not be updated on a call-by-call basis, while the second database may contain rapidly updating information such as the expected termination location of a particular call. In another embodiment CNAM database 141 may not contain any caller identification functionality. CNAM database 141 may simply comprise a database of records containing a information sufficient for identifying a particular call (i.e., an originating number) and information expected to be contained in a message from a remote switch (i.e., the point code of the expected terminating switch).

Figure 2A:
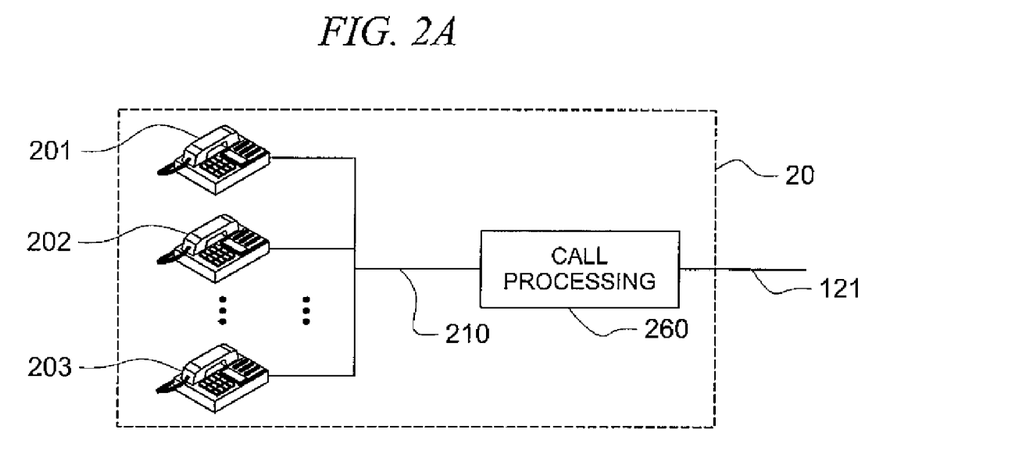
FIG. 2A shows one private network for use with an embodiment of the current invention.

FIG. 2A shows one private network 20 for use with an embodiment of the current invention. Private network 20 contains a plurality of terminals 201-203 coupled to call processing equipment 260 by a communications link 210. It should be understood that while 3 terminals are shown, private network 20 may contain any number of terminals. In a preferred embodiment, the terminals may be located at various locations within a facility. In a preferred embodiment, terminals 201-203 may simply be capable of providing plain old telephone service (POTS) and communications link 210 may be an analog line capable of transmitting POTS signals. In another embodiment, terminals 201-203 may comprise telephone systems (whether wireline or wireless), computer systems, facsimile systems, pages, personal digital assistants (PDAs), and/or the like. In one embodiment, terminals 201-203 may be phones contain VoIP functionality and communications link 210 may be capable of transmitting VoIP signals. Further, each of the plurality of terminals need not be the same type of device.

Figure 2B:
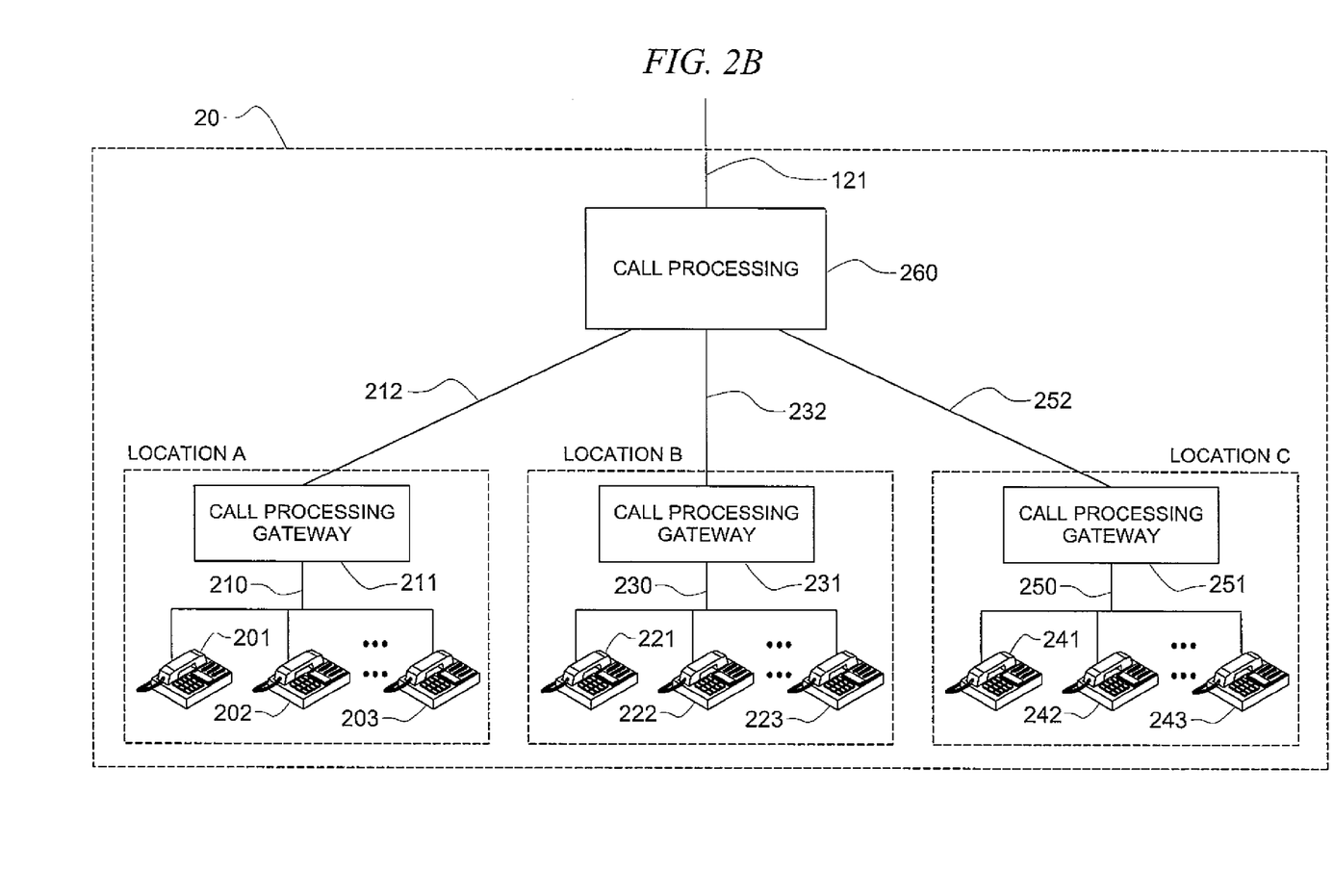
FIG. 2B shows another private network for use with an embodiment of the current invention.

FIG. 2B shows another private network 20 for use with one embodiment of the current invention. Private network 20 contains a plurality of terminals 201-203 at a first location coupled to call processing gateway 211 by communications link 210, a plurality of terminals 221-223 at a second location coupled to call processing gateway 231 by communications link 230, and a plurality of terminals 241-243 at a third location coupled to call processing gateway 251 by communications link 250. While three locations are shown, private network 20 may comprise any number of locations. Terminals 201-203, 221-223, and 241-243 may function as terminals 201-203 are described above and communications links 210, 230, and 250 may function as communication link 210 is described above. As discussed with regard to FIG. 2A, while three terminals are shown, the plurality of terminals at each location may comprise any number of terminals. Call processing gateways 211, 231, and 251 serve as a collection point for calls and data for a particular facility and provide a link to one or more central sites for call processing and other functionality. Call processing gateways 211, 231, and 251 may transmit information to call processing equipment 260 over communications link 212, 232, and 252 respectively. In a preferred embodiment, call processing gateways 211, 231, and 251 may comprise VoIP gateways or integrated access devices (IADs). Further description of this distributed architecture or may be utilized according to embodiments of the invention may be found in co-pending application entitled, "Centralized Call Processing," previously incorporated by reference.

Figure 3:
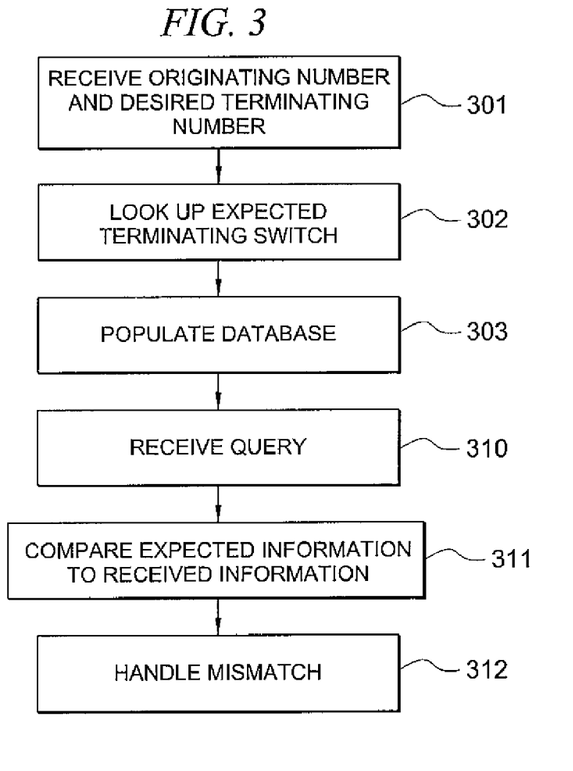
FIG. 3 shows a flow diagram of operation of the remote forwarding detection system of FIG. 1 according to an embodiment of the present invention.

FIG. 3 shows a flow diagram of operation of the remote forwarding detection system of FIG. 1 according to an embodiment of the present invention. In process 301, a transaction is received from private network 20 (FIGS. 1, 2A, and 2B) at CNAM database 141 (FIG. 1). The transaction relates to a specific call expected to be originated from private network 20. The transaction may be sent as an SS7 transaction over communications network 110 (FIG. 1). In a preferred embodiment, the transaction may be sent as an IP network or other network transaction over communications link 150 (FIG. 1). In a preferred embodiment, the transaction may be generated by the process described in FIG. 4. The transaction may contain information about the desired terminating location of a call. In a preferred embodiment, the transaction may contain an originating phone number and a desired terminating number. As described in the process illustrated in FIG. 4, the transaction may further contain a name to be displayed.

In process 302, a look up is performed to identify the terminating switch that homes the received desired terminating phone number. In another embodiment, process 302 may involve determining a different piece of information sufficient to identify the expected source of a message from the terminating end of a call. In another embodiment, process 302 may be performed at private network 20 (FIGS. 1, 2, and 2B) and the results may be transmitted in the transaction described in process 301. Process 302 may not be performed in some embodiments. However, it may be desirable to know the switch expected to home the desired terminating number. By knowing the expected terminating switch, it may be possible to detect when a call has been forwarded without authorization based on a query from the terminating switch, even when that query does not contain a requesting phone number. Because the query from the terminating switch requires a response, the query must identify the requesting switch at least in the form of a return address. Additionally, in some systems utilizing a dynamically updating CNAM database where caller identification information is call-specific, a number of calls may be associated with a single originating phone number and thus the identity of the terminating switch may provide a second piece of information to locate the proper caller identification information within the CNAM database.

The address of the switch on which the desired terminating number is homed may be located through a simple search of a Local Exchange Routing Guide (LERG) tables. When a number has been ported, an LNP query may be required. Such processing to identify to the switch on which a terminating number is homed is well known in the art. It should be understood that this look-up may be performed at other locations such as the call processing equipment 260 and transmitted as part of the transaction to the CNAM database 140. However, in some embodiments, it may desirable for this look-up to be performed at the CNAM database 140 or its associated call intelligence 141 in order to reduce the total transaction time since the CNAM database 140 and its associated call intelligence 141 may be located on the SS7 network while call processing equipment 260 may not be. In one embodiment, the located address of the expected terminating switch may be obtained in the form of a point code.

In process 303, a record is created in CNAM database 141 (FIG. 1). The record may contain the originating phone number and desired terminating phone number received in process 301 and the expected terminating switch looked up in process 302. In a preferred embodiment, the record may further contain caller identification information generated through the processes described in FIG. 4, below. In another embodiment, the record may be created in a second database separate from the database containing caller identification information. In this case, the database containing caller identification information may be used to respond to a CNAM query, while call intelligence 140 may use the second database to detect remote call forwarding, as described below.

In one embodiment, the information contained in the record will expire at some point in time, anywhere from possibly 10 to 20 or 30 seconds following the origination of the call. Thus, in some embodiments, the record may contain a validity flag and/or may contain a creation timestamp to indicate expiration. The required duration of the record may be signaled as part of the transaction received in process 301. In some embodiments, following the completion of the call or the failure of the call from the originating equipment, there may be optionally a transaction initiated from private network 20 to clear the transaction so that stale information regarding the originating number does not persist any longer than necessary. Such a message may be in addition to or in alternative to the expiration timer discussed above. In a preferred embodiment, process 303 is completed prior to receiving a query regarding the call subject of the record. Such timing may be necessary for real-time detection. In some embodiment, this timing is accomplished by transmitting the transaction received in process 301 prior to originating the call from private network 20. However, it should be understood that the system and method of the current invention are not limited to real-time detection.

In process 310, a query or other message is received from a remote switch. In a preferred embodiment, the query may be a CNAM query transmitted by the eventual terminating switch. In another embodiment, the message may be any message that allows the system to determine the identity or general location of the remote switch sending the message. The query will be received shortly after call origination when the customer associated with the terminating phone number has subscribed to caller identification services. In a preferred embodiment, the query may be received at both CNAM database 141 and associated call intelligence 140. In a preferred embodiment, the CNAM query comprises an originating phone number and an address of the requesting (terminating) switch. The address of the requesting switch may be in the form of a point code and/or any other address format. In a preferred embodiment, the CNAM query may further comprise the terminating phone number. The information is then extracted for use in process 311.

In process 311, the expected information regarding the terminating location is compared to the information received in process 310. In parallel to process 311, CNAM database 141 may respond to the CNAM query will caller identification information. In a preferred embodiment, the comparison takes place at call intelligence 140 (FIG. 1). The comparison may also take place in whole or in part at call processing 260 (FIGS. 2A and 2B) or any other part of private network 20 (FIGS. 1, 2A, and 2B). It may be preferable to perform process 311 at call intelligence 140 because call intelligence's 140 location on the SS7 network allows the system to make a positive or negative decision with respect to the call very rapidly. The comparison is performed by using the originating phone number extracted from the received message and, in some embodiments, other information such as a timestamp to locate a record in CNAM database 141 containing the originating phone number. The located record will contain information about the expected terminating location. This information about the expected location may comprise an expected terminating phone number and/or expected terminating switch address. The expected terminating switch address is then compared to the address information of the requesting switch extracted from the received message. Where the received message contains a requesting phone number, this requesting phone number may be compared to the expected terminating phone number contained in the located record.

By way of example, a call may be originated to terminal 130 on switch 131. In response to a transaction associated with the call, in processes 301-303, a look up of the switch on which terminal 130 is homed is performed and a record is created with the originating number, the phone number of terminal 130 and the point code of switch 131. When the call actually terminates at terminal 130, switch 131 will transmit a CNAM query to CNAM database 141 when the customer of terminal 130 has subscribed to CNAM services. Call intelligence 140 associated with CNAM database 141 will receive the query and compare the information in the query to the record associated with that call. The information will match. When the call is not terminated at terminal 130, but rather is forwarded to terminal 150 on switch 151, switch 151 will transmit a CNAM query to CNAM database 141 when the customer of terminal 150 has subscribed to CNAM services. Call intelligence 140 associated with CNAM database 141 will received the query and compare the information in the query to the record associated with that call and the information will not match.

In one embodiment, call intelligence 140 may report the result of the comparison back to private network 20 (FIGS. 1, 2A, and 2B). In a preferred embodiment, a report may be transmitted for each call, reporting a match, a mismatch, or that no query was received within a reasonable time after call origination. A reasonable period of time may be 20 to 30 seconds in some embodiments. The report may contain different information depending on the result. For example, where a mismatch occurs, the report may contain information about the location from which the query was actually received (i.e., the actual terminating switch and/or phone number).

In process 312, handling of mismatches is performed. As discussed above, call intelligence 140 (FIG. 1) may report the mismatch to private network 20 (FIGS. 1, 2A, and 2B). In a preferred embodiment, the mismatch is reported to call processing 260 (FIGS. 2A and 2B) within private network 20. Call processing 260 can choose to take action or no action based on the response. A choice may be made to the disconnect of the call, possibly with a message notifying them that this call is forwarded and that the system does not allow calls to be placed to forwarded numbers. Alternatively, the system could choose to record the phone call. The system could also wait until the called party answers the phone in order to obtain a voice sample or other information from the called party for later determination of who the called party might have been. To obtain this information, the system might allow the call to go on for a short period of time and then disconnect the call. Further actions could also include placing a customer service representative on the call, providing an alert to the proper personnel, lowering a payment verification point (PVP) or post-payment value amount, and/or the like.

Additionally, call intelligence 140 may instruct CNAM database 141 to return a different response in the case of a mismatch. In some embodiments the system may choose to not return the name stored in the CNAM database when the switch originating the CNAM query is not the switch expected to be handling the CNAM query. The system may instead choose to return a generic response such as OUT OF AREA or PRIVATE. In some embodiments, the initial transaction message may designate the proper handling of such a mismatch.

Figure 4:
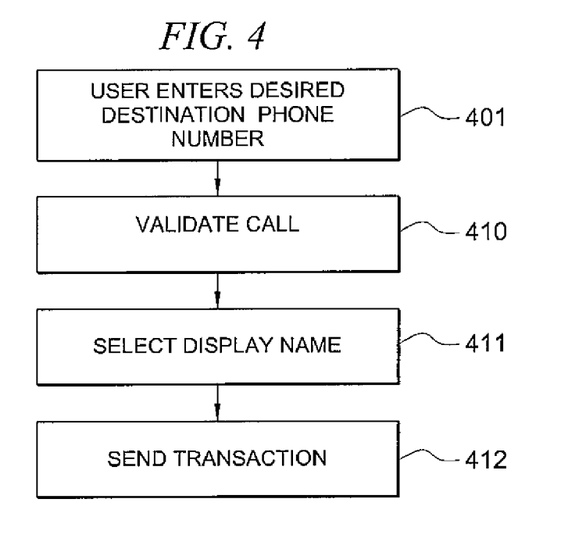
FIG. 4 shows a flow diagram of operation of the system of FIG. 1 to dynamically populate a database with caller identification information according to an embodiment of the present invention.

FIG. 4 shows a flow diagram of operation of the system of FIG. 1 to dynamically populate a database with caller identification information according to an embodiment of the present invention. In process 401, a user may attempt to place a call by entering a desired destination phone number at a terminal such as terminal 201 (FIGS. 2A and 2B). In one embodiment, the user may be a prisoner at a detention facility and may be required to provide additional information. For example, the prisoner may be required to enter a PIN number, or otherwise confirm his or her identity through the use of biometrics, RFID bracelets, or other methods commonly known to those skilled in the art. Further description of various identification techniques may be found in co-pending application entitled, "System and Methods for Cross-Hatching Biometrics with Other Identifying Data," previously incorporated by reference. In another embodiment, a user may be previously associated with terminal 201 and therefore not required to provide identification information.

In response to the attempt to place the call, a series of validations are performed in process 410. Process 410 may take place at the call processing equipment 260 (FIGS. 2A and 2B) in one embodiment. Processing may also involve resources located on communications network 110 (FIG. 1) such as call intelligence 140 (FIG. 1) or some other call intelligence or database entity. In one embodiment, during these validations information is pulled regarding a contract, a facility, possibly a traffic owner of who owns the particular traffic to the phone number being requested—the local interlata, along with specific information about how this call should be handled. The billing and security nature of the call (e.g., is it a collect call, is it a prepaid call, is it free, does it go to an attorney) may also be determined. Additionally, an inmate may also have a specific allowed number list or a specific personal allowed number (PAN) list authorizing what calls he is allowed to make that may be checked during the validation process. Based on the gathered information, a decision may be made to not allow the call, to record the call, or to take other action. For example, the call may be scored by relative risk for further treatment during the duration of the call. Further discussion of such validations and scoring can be found in co-pending and commonly assigned United States patent application entitled "Centralized Call Processing," United States patent application entitled "Call Processing with Voice Over Internet Protocol Transmission," United States patent application entitled "Optimizing Profitability in Business Transactions," United States patent application entitled "Information Management and Movement System and Method," United States patent application entitled "Systems and Methods for Transaction Authorization Determination," United States patent application entitled "System and Method for Account Establishment and Transaction Management using Interrupt Messaging," and United States patent application entitled "Systems and Methods for Cross-Hatching Biometrics with Other Identifying Data," all previously incorporated by reference.

Using the information gathered during the validation procedure, in process 411 a choice is made as to what name is displayed on a caller ID display unit in process 411. process 411 may be performed concurrently with process 410 using the same information at the same location. Possible display names may include the name of the facility, the name of the carrier handling the traffic, the name of the inmate, or even a custom name that is chosen to be displayed based on an allowed number list or other authenticating list. Additionally, a choice may be made not to display any name. In this case, a generic name such as PRIVATE, OUT OF AREA, or NOT PROVIDED may be selected. Any number of algorithms may be used to in the selection process, and different algorithms may be used based on different gathered information. For example, if the call is a collect call, a different selection algorithm may be used than for prepaid calls.

Following validation and name selection, a transaction is sent to a CNAM database in process 412. In some embodiments, the transaction may be sent prior to the call being launched. However, the transaction need only be sent in time to allow population of the CNAM database in time to respond to an incoming query. In one embodiment, the transaction is sent from the call processing equipment 260 (FIGS. 2A and 2B) of the private network 20 (FIGS. 1, 2A, and 2B) to the CNAM database 141 (FIG. 1). The transaction may be sent as an SS7 transaction over communications network 110 (FIG. 1). In a preferred embodiment, the transaction may be sent as an IP network or other network transaction over communications link 150 (FIG. 1). In one embodiment, the contents of the transaction comprise the originating phone number, the desired terminating number, and the name to be displayed. It should be understood that the transaction may contain additional or no information. For example, the transaction may contain alternate display names for certain events or instructions to the call intelligence 140. The transaction may also contain risk information with regard to the call to assist processing by call intelligence 140.

In one embodiment, the CNAM database may use the originating phone number as the primary key for storing and locating call records. Thus, there may be a pool of originating phone numbers available for use with private network 20 such that there is never more than one active call associated with any given originating phone number at a time for a call. Call processing 260 may assign an originating number to a call based on this principle prior to or as part of process 412.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for detecting remote call forwarding, said method comprising:
    receiving a message from a remote entity, said message comprising information identifying a communication session and an address of said remote entity;
    locating a record in a database using said received information identifying a communication session; wherein said located record contains an expected address of a remote entity, an expected terminating telephone number; and
    comparing information in said message to information in said located record to determine if call forwarding has been implemented with respect to said communication session.

2. The method of claim 1 wherein said comparing information in said message to information in said located record comprises:
    comparing said address of said remote entity received in said message to said expected address of said remote entity contained in said located record.

3. The method of claim 1 wherein said remote entity comprises a switch, said address of said remote entity comprises a telephone number homed on said switch, and said comparing information in said message to information in said located record comprises:
    comparing said telephone number homed on said switch received in said message to said expected terminating telephone number contained in said located record.

4. The method of claim 2 further comprising:
    prior to receiving said message from said remote entity, creating a record in said database, said record including information identifying said communication session and an expected address of a remote entity.

5. The method of claim 2 wherein said remote entity comprises a switch, said method further comprising:
    based at least in part on an expected terminating phone number, determining an expected address of said remote entity.

6. The method of claim 5 wherein said determining an expected address of said remote entity comprises querying a database.

7. The method of claim 5 wherein said determining an expected address of said remote entity comprises performing an LNP query to locate the terminating point code of the terminating switch on which said expected terminating phone number is homed.

8. The method of claim 1 wherein said message from a remote entity is a CNAM query.

9. The method of claim 1 further comprising:
    transmitting the result of said comparison to originating equipment.

10. The method of claim 1 further comprising:
    when said comparison does not match, transmitting a message to originating equipment.

11. The method of claim 1 further comprising:
    when said comparison does not match, terminating said call.

12. The method of claim 1 wherein said message from said remote entity comprises a query requesting caller identification information, said method further comprising:
    when said comparison does match, responding to said query with a first response; and
    when said comparison does not match, responding to said query with a second response.

13. The method of claim 12 comprising:
    based at least in part on said information identifying a communication session received in said query, locating a record in a database, wherein said first response comprises transmitting to said remote entity a name to be displayed contained in said located record and said second response comprises transmitting to said remote entity a response indicating that identification information of the caller is not available.

14. A method for detecting remote call forwarding of a call from an originating number comprising:
    receiving a destination phone number;
    determining identification information of the switch on which said destination phone number is homed;
    receiving a query from a remote switch, wherein said query includes identification information of said remote switch;
    comparing said identification of said remote switch received in said query to said determined identification information of the switch on which said destination phone number is homed for said call from said originating phone number; and
    identifying remote call forwarding of the call when the identification of said remote switch and the identification of the switch on which said destination phone number is homed do not match.

15. The method of claim 14 further comprising:
    transmitting the result of said comparison to a remote call processing entity.

16. The method of claim 14 further comprising:
    when said comparison does not match, transmitting the result of said comparison to a remote call processing entity.

17. The method of claim 14 further comprising:
    when said comparison does not match, terminating said call.

18. The method of claim 14 further comprising:
    when said comparison does match, responding to said query with a first response; and
    when said comparison does not match, responding to said query with a second response.

19. A system for detecting remote call forwarding comprising:
    a database comprising a plurality of records, said records comprising information of an expected remote entity;
    means for receiving a message from a remote entity, said message including information with respect to said remote entity;
    means for locating in said database a record corresponding to said originating phone number;

means for comparing said information with respect to said remote entity received in said message to said information of an expected remote entity contained in said located record; and     means for identifying remote call forwarding when the information with respect to said remote entity and said information of an expected remote entity do not match.

20. The system of claim 19 wherein said remote entity comprises a switch, said system further comprising:

means for determining identification information of an expected switch based, at least in part, on an expected terminating phone number.

21. The system of claim 19 further comprising:

means for processing in response to said comparison.

22. The system of claim 19 further comprising:

means for transmitting to originating equipment the results of said comparison.

23. The system of claim 20 further comprising:

means for transmitting to originating equipment the results of said comparison.

\* \* \* \* \*